United States Patent
Ko et al.

(10) Patent No.: US 8,731,086 B2
(45) Date of Patent: May 20, 2014

(54) METHOD OF TRANSMITTING CONTROL INFORMATION IN MULTIPLE ANTENNA SYSTEM

(75) Inventors: Hyun Soo Ko, Seoul (KR); Bin Chul Ihm, Seoul (KR); Sung Ho Park, Seoul (KR); Jae Wan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 706 days.

(21) Appl. No.: 12/663,701

(22) PCT Filed: Jun. 5, 2008

(86) PCT No.: PCT/KR2008/003175
§ 371 (c)(1),
(2), (4) Date: Dec. 8, 2009

(87) PCT Pub. No.: WO2008/150126
PCT Pub. Date: Dec. 11, 2008

(65) Prior Publication Data
US 2010/0177844 A1 Jul. 15, 2010

(30) Foreign Application Priority Data
Jun. 8, 2007 (KR) .................. 10-2007-0056016

(51) Int. Cl.
*H04B 7/02* (2006.01)
(52) U.S. Cl.
USPC ........... 375/267; 375/148; 375/260; 375/340; 370/342; 370/334; 370/491
(58) Field of Classification Search
USPC .......... 375/295, 260, 340, 148, 267; 370/329, 370/491, 342, 334
See application file for complete search history.

(56) References Cited

U.S. PATENT DOCUMENTS

| | | | | |
|---|---|---|---|---|
| 7,697,622 | B2* | 4/2010 | Han et al. | 375/260 |
| 7,839,823 | B2* | 11/2010 | Yu et al. | 370/329 |
| 7,852,811 | B2* | 12/2010 | McCoy | 370/334 |
| 8,503,561 | B2* | 8/2013 | Kim et al. | 375/267 |
| 2007/0036204 | A1* | 2/2007 | Ishii et al. | 375/148 |
| 2008/0080467 | A1* | 4/2008 | Pajukoski et al. | 370/342 |
| 2008/0212702 | A1* | 9/2008 | Pan et al. | 375/260 |
| 2008/0232484 | A1* | 9/2008 | Budianu et al. | 375/260 |
| 2008/0260058 | A1* | 10/2008 | Li | 375/260 |
| 2009/0323840 | A1* | 12/2009 | Lee et al. | 375/260 |
| 2010/0178950 | A1* | 7/2010 | Erceg | 455/506 |

FOREIGN PATENT DOCUMENTS

| | | |
|---|---|---|
| JP | 2007-110664 | 4/2007 |
| WO | 2005-043851 | 5/2005 |

OTHER PUBLICATIONS

T. Pande et al., "A Weighted Least Squares Approach to Precoding with Pilots for MIMO-OFDM," IEEE Transactions on Signal Processing, vol. 54, No. 10, pp. 4067-4073, Oct. 2006.

* cited by examiner

*Primary Examiner* — Eva Puente
(74) *Attorney, Agent, or Firm* — Lee, Hong, Degerman, Kang & Waimey

(57) ABSTRACT

A method of transmitting control information in a multiple antenna system includes generating a dedicated pilot including a weight and a weight index indicating the weight, and transmitting the dedicated pilot. Detection performance can be improved when control information such as a weight and a weight index is transmitted on a pilot.

3 Claims, 5 Drawing Sheets

METHOD OF TRANSMITTING CONTROL INFORMATION IN MULTIPLE ANTENNA SYSTEM

CROSS-REFERENCE TO RELATED APPLICATIONS

This application is the National Stage filing under 35 U.S.C. 371 of International Application No. PCT/KR2008/003175, filed on Jun. 5, 2008, which claims the benefit of earlier filing date and right of priority to Korean Application No. 10-2007-0056016, filed on Jun. 8, 2007.

TECHNICAL FIELD

The present invention relates to wireless communications, and more particularly, to a method for transmitting control information in a multiple antenna system.

BACKGROUND ART

Communication services have experienced a fast growing demand, for example, generalization of information communication services, introduction of various multimedia services, and provision of high-quality services. To meet such a demand, various wireless communication techniques have been studied in various fields.

In next generation wireless communication systems, massive multimedia data can be transmitted at a high speed by using limited radio resources. To achieve this, spectral efficiency has to be maximized since a radio channel has limited bandwidth. In addition, inter-symbol interference and frequency selective fading, which occur during high-speed mobility, have to be overcome. Various techniques have been developed to maximize the spectral efficiency, and among them, an orthogonal frequency division multiplexing (OFDM) scheme and a multiple input multiple output (MIMO) scheme are most promising techniques.

The OFDM uses a plurality of orthogonal sub-carriers. Further, the OFDM uses orthogonality between inverse fast Fourier transform (IFFT) and fast Fourier transform (FFT). A transmitter transmits data after performing IFFT. A receiver restores original data by performing FFT on a received signal. The transmitter uses IFFT to combine the plurality of sub-carriers, and the receiver uses FFT to split the plurality of sub-carriers. According to the OFDM, complexity of the receiver can be reduced in a frequency selective fading environment of a broadband channel, and the spectral efficiency can be improved through selective scheduling in frequency domain by utilizing channel characteristics which are different from one subcarrier to another. An orthogonal frequency division multiple access (OFDMA) is an OFDM-based multiple access scheme. According to the OFDMA, radio resources can be more efficiently used by allocating different subcarriers to multi-users.

The MIMO scheme can be mainly used for two purposes. A first purpose is to increase diversity gain in order to reduce performance degradation resulted from a channel fading environment. A second purpose is to increase a data transmission rate. The MIMO scheme outperforms a single-input single-output (SISO) system using one transmit/receive antenna in that more data can be transmitted without having to increase the frequency band.

A MIMO channel is provided by multiple antennas and can be decomposed into independent channels. If the number of transmit antennas is Nt and the number of receive antennas is Nr, then the number of independent channels is Ni, where Ni≤min{Nr, Ni}. In this case, each independent channel can be referred to as a spatial layer. In general, a rank is defined as the number of non-zero eigen-values of a MIMO channel matrix and corresponds to the maximum number of independent channels.

In a MIMO system, a transmitter performs precoding in which a transmit signal is multiplied by a weight. The precoding is a scheme in which the transmit signal is pre-processed by using the weight before transmission. The weight is selected or calculated based on channel condition on which the transmit signal is transmitted. In general, in a frequency division duplex (FDD) system, a receiver determines a weight and transmits the weight to a transmitter, and the transmitter determines a actual weight, which is used in actual transmission, based on the received weight. In a time division duplex (TDD) system, the transmitter determines the weight by using a sounding channel.

In order for the receiver to post-process the precoded signal, the receiver has to know the weight. That is, the transmitter needs to send to the receiver information on which weight is used. In general, the weight is configured in a form of a vector or a matrix. Thus, if information on every elements of the vector or the matrix is transmitted without processing, the spectral efficiency may deteriorate due to a large overhead.

Accordingly, there is need for a method for efficiently transmitting weight information in a multiple antenna system.

DISCLOSURE OF INVENTION

Technical Problem

A method is sought for transmitting control information by using a pilot in a multiple antenna system.

Technical Solution

In an aspect, a method of transmitting control information in a multiple antenna system is provided. The method includes generating a dedicated pilot including a weight and a weight index indicating the weight, and transmitting the dedicated pilot.

The dedicated pilot can be generated by precoding a pilot carrying the weight index by using the weight.

In another aspect, a method for transmitting a multiple input multiple output (MIMO) control signal in a wireless communication system is provided. The method includes multiplexing the MIMO control signal with a pilot, precoding the multiplexed pilot and transmitting the precoded pilot.

In still another aspect, a method of detecting control information in a wireless communication system is provided. The method includes receiving a dedicated pilot which is multiplexed with a weight index indicating a weight, and detecting the weight index from the dedicated pilot.

Advantageous Effects

Detection performance can be improved when control information such as a weight and a weight index is transmitted on a pilot.

MODE FOR THE INVENTION

Figure 1:
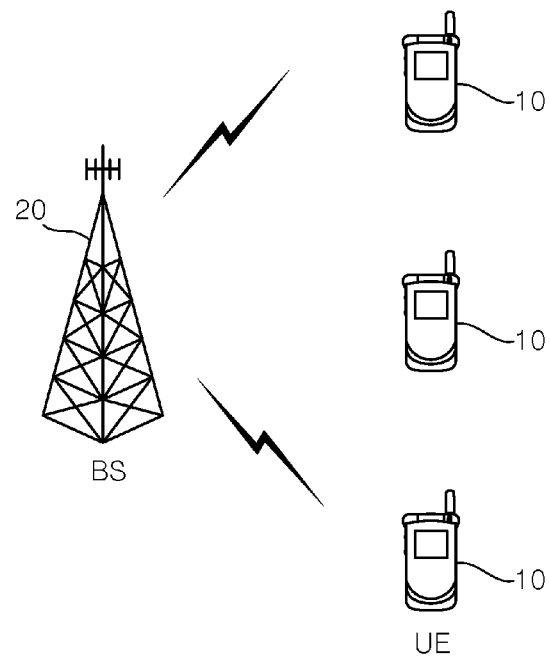
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes a base station (BS) 20 and at least one user equipment (UE) 10. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

Downlink represents a communication link from the BS 20 to the UE 10, and Uplink represents a communication link from the UE 10 to the BS 20. In downlink, a transmitter may be a part of the BS 20, and a receiver may be a part of the UE 10. In uplink, the transmitter may be a part of the UE 10, and the receiver may be a part of the BS 20.

Figure 2:
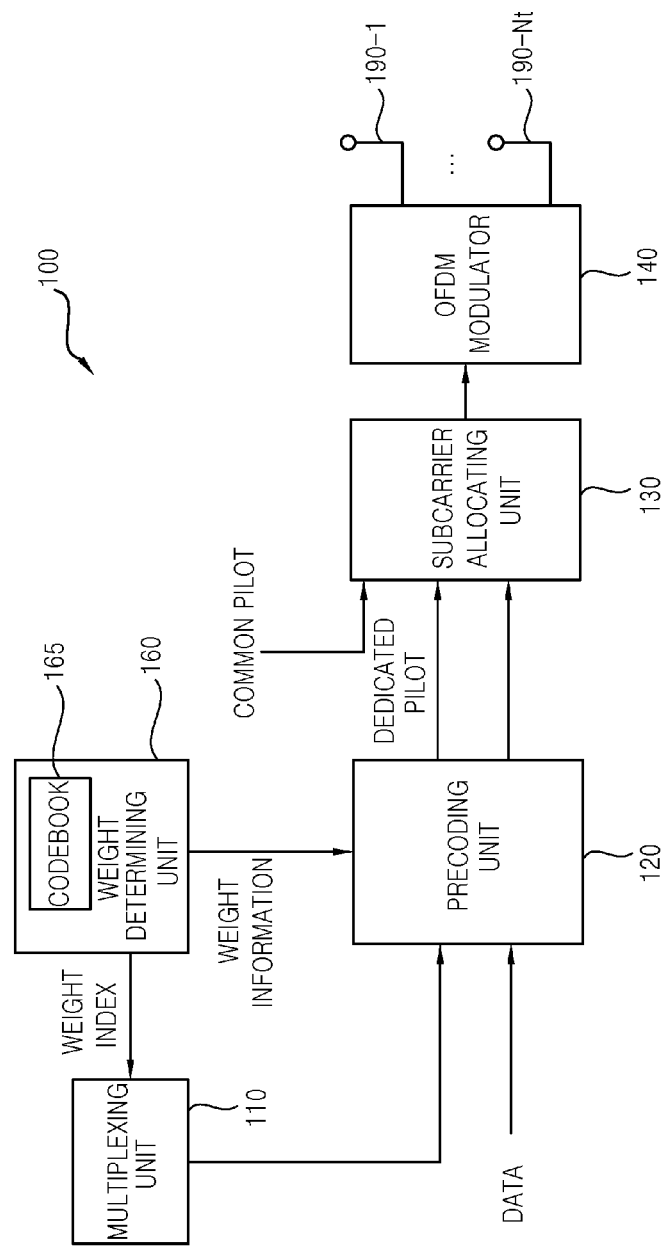
FIG. 2 is a block diagram showing a transmitter according to an embodiment of the present invention.

FIG. 2 is a block diagram showing a transmitter according to an embodiment of the present invention.

Referring to FIG. 2, a transmitter 100 includes a multiplexing unit 110, a precoding unit 120, a subcarrier allocating unit 130, an orthogonal frequency division multiplexing (OFDM) modulator 140, and a weight determining unit 160. The transmitter 100 includes Nt (Nt>1) transmit antennas 190-1 to 190-Nt.

The multiplexing unit 110 multiplexes a weight index with a pilot. The pilot is a signal used for channel estimation and is previously known between the transmitter 100 and a receiver. The pilot is also referred to as a reference signal. The weight index is an index for a weight used for precoding and transmitted from the weight determining unit 160. The weight index is one of multiple input multiple output (MIMO) control signals.

The precoding unit 120 performs precoding by multiplying input data by the weight. The precoding unit 120 uses weight information received from the weight determining unit 160. The pilot, which is output from the multiplexing unit 110 after being multiplexed with the weight index, may be input to the precoding unit 120. A signal obtained by performing precoding on the multiplexed pilot is referred to as a dedicated pilot. The dedicated pilot can be regarded as a pilot on which both the weight and the weight index are carried.

The subcarrier allocating unit 130 allocates subcarriers to the precoded signal, the dedicated pilot, and a common pilot. The common pilot represents a pilot transmitted for channel estimation. The dedicated pilot represents a pilot transmitted in order to estimate both a channel and a value including the weight. In addition, the weight index is also carried on the dedicated pilot.

The OFDM modulator 140 OFDM-modulates an input symbol and thus outputs an OFDM symbol. The OFDM modulator 140 can perform inverse fast Fourier transform (IFFT) on the input symbol. After performing IFFT, the OFDM modulator 140 can insert a cyclic prefix (CP). The OFDM symbol is transmitted through each of the transmit antennas 190-1 to 190-Nt.

The weight determining unit 160 selects the weight from a codebook 165. The codebook 165 is a group of weights and includes at least one weight. In the transmitter having multiple transmit antennas, the weight has a form of a matrix or a vector and can be referred to as other terminologies such as a precoding matrix, a precoding code, etc. For example, if the codebook 165 (B) includes 6 weights, it can be expressed by $B = \{W^0, W^1, W^2, W^3, W^4, W^5\}$, where a superscript denotes a weight index. There is no limit when the weight is selected from the codebook 165. For example, an open-loop method in which the weight is determined without receiving feedback from the receiver or a closed-loop method in which the weight is determined by using feedback information received from the receiver may be used. The weight determining unit 160 sends information on the determined weight to the precoding unit 120, and also sends the weight index to the multiplexing unit 110 in order to multiplex the weight index with the pilot.

As described above, in order for the receiver to process the precoded signal, the receiver needs to know the weight or the weight index. A method is proposed to reduce an overhead resulted from the transmission of the weight information and to enhance a detection performance of the weight information in the receiver. In the proposed method, the weight and the weight index are both carried and transmitted on the pilot.

Figure 3:
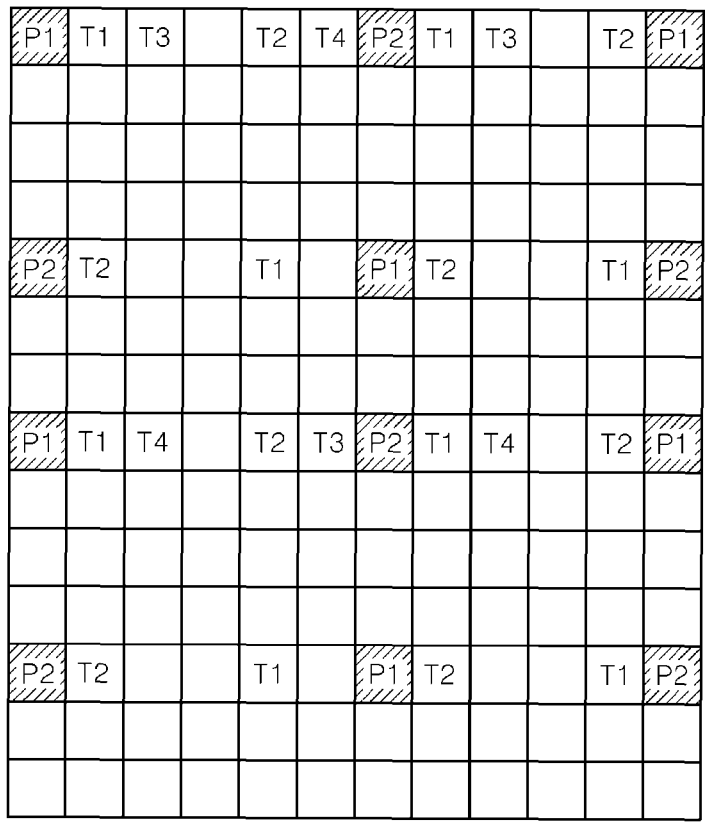
FIG. 3 shows an example of a downlink subframe.

FIG. 3 shows an example of a downlink subframe. The downlink subframe includes a plurality of OFDM symbols in time domain and a plurality of subcarriers in frequency domain. The subframe is one resource grid defined for each transmit antenna. A time for transmitting one subframe is defined as a transmission time interval (TTI). A radio frame can include a plurality of subframes. For example, one radio frame may include 10 subframes.

Referring to FIG. 3, common pilots T1, T2, T3, and T4 and dedicated pilots P1 and P2 are distributively arranged in a subframe. The first common pilot T1 is transmitted through a first transmit antenna. The second common pilot T2 is transmitted through a second transmit antenna. The third common pilot T3 is transmitted on a third transmit antenna. The fourth common pilot T4 is transmitted through a fourth transmit antenna. The first dedicated pilot P1 is transmitted through the first transmit antenna. The second dedicated pilot P2 is transmitted through the second transmit antenna.

Although it is shown herein that the common pilots use four transmit antennas and the dedicated pilots use two transmit antennas, there is no limit in the number of transmit antennas through which the common pilots or the dedicated pilots are transmitted. In addition, the arrangement of the common and dedicated pilots is shown for exemplary purposes only, and thus they may be arranged in the subframe in various patterns.

Now, an operation of detecting a receive signal by using a dedicated pilot will be described.

A model for an receive signal vector y can be expressed as shown

MathFigure 1

$$y = HWS + N \quad [\text{Math.1}]$$

where H denotes a channel matrix, W denotes a weight, S denotes a signal vector, and N denotes a noise vector. The weight W may have a form of a matrix or a vector. A common pilot is used to estimate the channel matrix H. A dedicated pilot is used to estimate HW. That is, a receiver uses HW obtained from the dedicated pilot in order to detect S.

Advantageously, the dedicated pilot can detect S by directly acquiring the equivalent channel HW. In addition, when the dedicated pilot is transmitted together with the common pilot, a channel estimated by the common pilot has to be changed to the equivalent channel by using the weight obtained from the dedicated pilot. Therefore, the dedicated pilot eventually becomes a signal for transmitting the weight. The weight transmitted on the dedicated pilot has to satisfy a target detection error probability in an operation region. Therefore, a proper transmission method has to be taken into account.

When the dedicated pilot is used, the receiver advantageously detects the signal vector S by using HW even if the receiver cannot know the weight W directly. However, in a general codebook-based precoding scheme, the codebook is designed focusing on a value that can represent a channel. Therefore, detection performance between weights included in the codebook is not taken into account. Accordingly, the detection performance cannot be ensured if only the weights are carried and transmitted on the dedication pilot. According to the present invention, the detection performance can be improved by carrying the weight index together with the weight included in the dedicated pilot when transmitted.

Now, a method for transmitting a weight index by carrying it on a dedicated pilot will be described.

The weight index represents an index of a weight selected for precoding from a codebook. For clarity, it is assumed that the number of transmit antennas is Nt, and four transmit symbols (i.e., s1, s2, s3, and s4) are used for the weight index. When quadrature phase-shift keying (QPSK) modulation is used, the four transmit symbols can express an 8-bit codeword. That is, the 8-bit codeword is used as the weight index, and is transmitted by being mapped to the four transmit symbols.

Table 1 shows an example in which a weight and a weight index are carried and transmitted on a dedicated pilot for each rank.

the dedicated pilot one by one with a result obtained from multiplying the weight and the weigh index by using the codebook.

Table 2 shows an example in which a weight and a weight index are carried and transmitted on a dedicated pilot according to a spatial multiplexing scheme.

TABLE 2

| Subcarrier Or OFDM symbol | #1 | #2 | #3 | #4 |
|---|---|---|---|---|
| [Rank 1] W:Nt × 1 | $Ws_1$ | $Ws_2$ | $Ws_3$ | $Ws_4$ |
| [Rank 2] W:Nt × 2 | $W\begin{bmatrix}s_1\\s_2\end{bmatrix}$ | $W\begin{bmatrix}s_3\\s_4\end{bmatrix}$ | $W\begin{bmatrix}s_1\\s_2\end{bmatrix}$ | $W\begin{bmatrix}s_3\\s_4\end{bmatrix}$ |
| [Rank 3] W:Nt × 3 | $W\begin{bmatrix}s_1\\s_2\\s_3\end{bmatrix}$ | $W\begin{bmatrix}s_1\\s_2\\s_3\end{bmatrix}$ | $W\begin{bmatrix}s_1\\s_2\\s_3\end{bmatrix}$ | $W\begin{bmatrix}s_1\\s_2\\s_3\end{bmatrix}$ |
| [Rank 4] W:Nt × 4 | $W\begin{bmatrix}s_1\\s_2\\s_3\\s_4\end{bmatrix}$ | $W\begin{bmatrix}s_1\\s_2\\s_3\\s_4\end{bmatrix}$ | $W\begin{bmatrix}s_1\\s_2\\s_3\\s_4\end{bmatrix}$ | $W\begin{bmatrix}s_1\\s_2\\s_3\\s_4\end{bmatrix}$ |

In the spatial multiplexing scheme, transmit symbols can be multiplexed a plurality of times corresponding to the number of ranks when transmitted. If a rank is 2, a maximum of two transmit symbols can be multiplexed and then transmitted. If the rank is 4, four transmit symbols can be concurrently transmitted, and thus information on one weight index can be transmitted at once.

As the rank increases, more resources are required because the dedicated pilot has to transmit weight information. Therefore, the weight information for a high rank may not be able to be expressed under a limited resource. According to the proposed scheme, the same resource can be used for all ranks.

TABLE 1

| → Transmission |
|---|
| 1  2  3  4  5  6  7  8  9  10  11  12  13  14  15  16 |

[Rank 1] W: Nt × 1

$Ws_1$  $Ws_2$  $Ws_3$  $Ws_4$
[Rank 2] W = [$W_1$ $W_2$], $W_k$: Nt × 1

$W_1s_1$  $W_2s_1$  $W_1s_2$  $W_2s_2$  $W_1s_3$  $W_2s_3$  $W_1s_4$  $W_2s_4$
[Rank 3] W = [$W_1$ $W_2$ $W_3$], $W_k$: Nt × 1

$W_1s_1$  $W_2s_1$  $W_3s_1$  $W_1s_2$  $W_2s_2$  $W_3s_2$  $W_1s_3$  $W_2s_3$  $W_3s_3$  $W_1s_4$  $W_2s_4$  $W_3s_4$
[Rank 4] W = [$W_1$ $W_2$ $W_3$ $W_4$], $W_k$: Nt × 1

$W_1s_1$  $W_2s_1$  $W_3s_1$  $W_4s_1$  $W_1s_2$  $W_2s_2$  $W_3s_2$  $W_4s_2$  $W_1s_3$  $W_2s_3$  $W_3s_3$  $W_4s_3$  $W_1s_4$  $W_2s_4$  $W_3s_4$  $W_4s_4$

In a rank 1, a weight W is an Nt×1 vector, and each weight is assigned to one transmit symbol. One weight index can be transmitted through a total of 4 times of transmission. In a rank 2, the weight W is an Nt×2 matrix, and transmit symbols are carried on both column vectors $W_1$ and $W_2$. In a rank 3, the weight W is an Nt×3 matrix, and the transmit symbols are carried on column vectors $W_1$, $W_2$, and $W_3$. In a rank 4, the weight W is an Nt×4 vector, and the transmit symbols are carried on column vectors $W_1$, $W_2$, $W_3$, and $W_3$.

When a receiver receives a dedicated pilot carrying the weight index, the receiver can obtain a weight by correlating Table 3 shows an example in which a weight and a weight index are carried and transmitted on a dedicated pilot.

TABLE 3

| Subcarrier Or OFDM symbol | #1 | #2 | #3 | #4 |
|---|---|---|---|---|
| [Rank 1] W:Nt × 1 | $Ws_1$ | $Ws_2$ | $Ws_3$ | $Ws_4$ |

TABLE 3-continued

| Subcarrier Or OFDM symbol | #1 | #2 | #3 | #4 |
|---|---|---|---|---|
| [Rank 2] W:Nt × 2 | $W\begin{bmatrix}s_1\\s_2\end{bmatrix}$ | $W\begin{bmatrix}s_2\\s_1\end{bmatrix}$ | $W\begin{bmatrix}s_3\\s_4\end{bmatrix}$ | $W\begin{bmatrix}s_4\\s_3\end{bmatrix}$ |
| [Rank 3] W:Nt × 3 | $W\begin{bmatrix}s_1\\s_2\\s_3\end{bmatrix}$ | $W\begin{bmatrix}s_4\\s_1\\s_2\end{bmatrix}$ | $W\begin{bmatrix}s_3\\s_4\\s_1\end{bmatrix}$ | $W\begin{bmatrix}s_2\\s_3\\s_4\end{bmatrix}$ |
| [Rank 4] W:Nt × 4 | $W\begin{bmatrix}s_1\\s_2\\s_3\\s_4\end{bmatrix}$ | $W\begin{bmatrix}s_4\\s_1\\s_2\\s_3\end{bmatrix}$ | $W\begin{bmatrix}s_3\\s_4\\s_1\\s_2\end{bmatrix}$ | $W\begin{bmatrix}s_2\\s_3\\s_4\\s_1\end{bmatrix}$ |

If a rank is 2, two transmit symbols to be multiplied to the weight are swapped in location for each subcarrier (or OFDM symbol) to obtain antenna diversity gain. If the rank is greater than 3, the transmit symbols are transmitted by cyclic shifting.

In the spatial multiplexing scheme, the transmit symbols are transmitted through the same transmit antenna all the time. When the transmit symbols are transmitted through different transmit antennas according to resources, a spatial diversity can be obtained.

Table 4 shows another example in which a weight and a weight index are carried and transmitted on a dedicated pilot.

TABLE 4

| Subcarrier | #1 | #2 | #3 | #4 |
|---|---|---|---|---|
| [Rank 1] W:Nt × 1 | $Ws_1$ | $Ws_2$ | $Ws_3$ | $Ws_4$ |
| [Rank 2] W:Nt × 2 | $W\begin{bmatrix}s_1\\s_2\end{bmatrix}$ | $W\begin{bmatrix}-s_2^*\\s_1^*\end{bmatrix}$ | $W\begin{bmatrix}s_3\\s_4\end{bmatrix}$ | $W\begin{bmatrix}-s_4^*\\s_3^*\end{bmatrix}$ |
| [Rank 3] W:Nt × 3 | $W\begin{bmatrix}s_1\\s_2\\0\end{bmatrix}$ | $W\begin{bmatrix}-s_2^*\\s_1^*\\0\end{bmatrix}$ | $W\begin{bmatrix}0\\s_3\\s_4\end{bmatrix}$ | $W\begin{bmatrix}0\\-s_4^*\\s_3^*\end{bmatrix}$ |
| [Rank 4] W:Nt × 4 | $W\begin{bmatrix}s_1\\s_2\\0\\0\end{bmatrix}$ | $W\begin{bmatrix}-s_2^*\\s_1^*\\0\\0\end{bmatrix}$ | $W\begin{bmatrix}0\\0\\s_3\\s_4\end{bmatrix}$ | $W\begin{bmatrix}0\\0\\-s_4^*\\s_3^*\end{bmatrix}$ |

In order to transmit a transmit symbol, a space-time block code (STBC) scheme or a space-frequency block code (SFBC) scheme is used. Herein, $s_1^*$, $s_2^*$, $s_3^*$, and $s_4^*$ are complex conjugates of $s_1$, $s_2$, $s_3$, and $s_4$, respectively. The use of the STBC scheme or the SFBC scheme can reduce complexity of the receiver.

Figure 4:
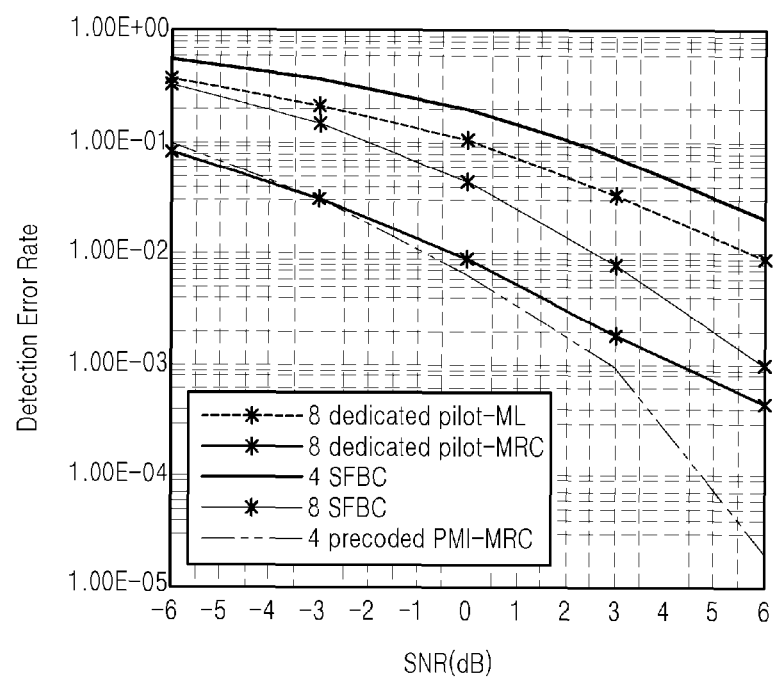
FIG. 4 is a graph showing a detection error rate when 4 transmit antennas are used and a rank is 1.
Figure 5:
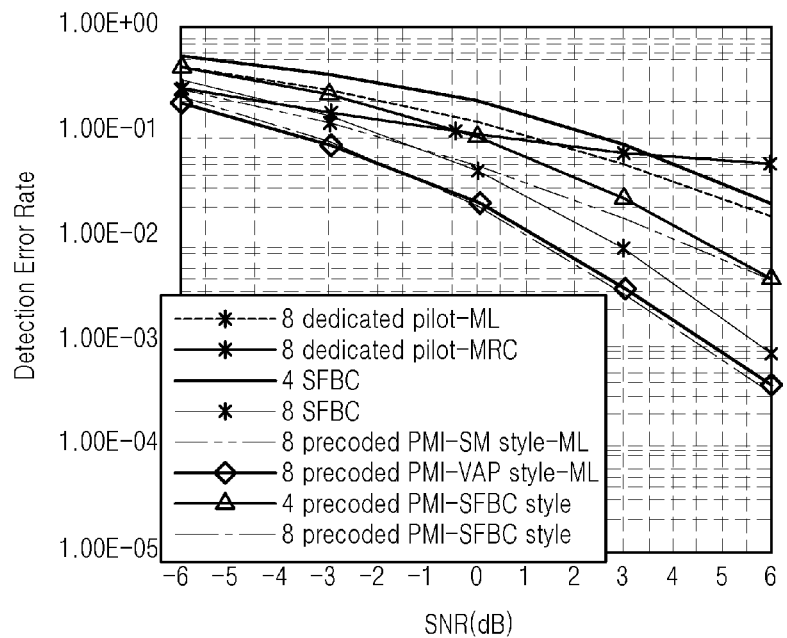
FIG. 5 is a graph showing a detection error rate when 4 transmit antennas are used and a rank is 2.
Figure 6:
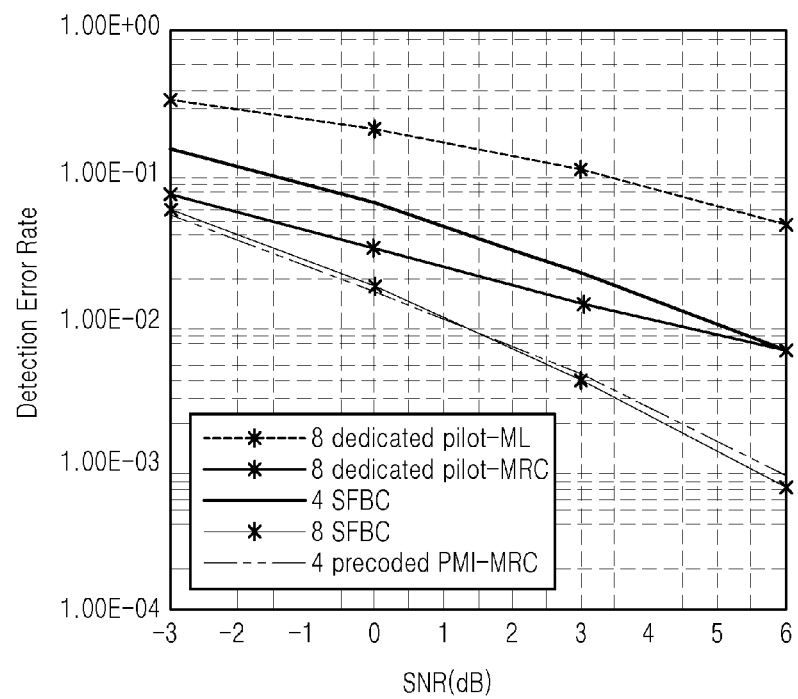
FIG. 6 is a graph showing a detection error rate when 2 transmit antennas are used and a rank is 1.
Figure 7:
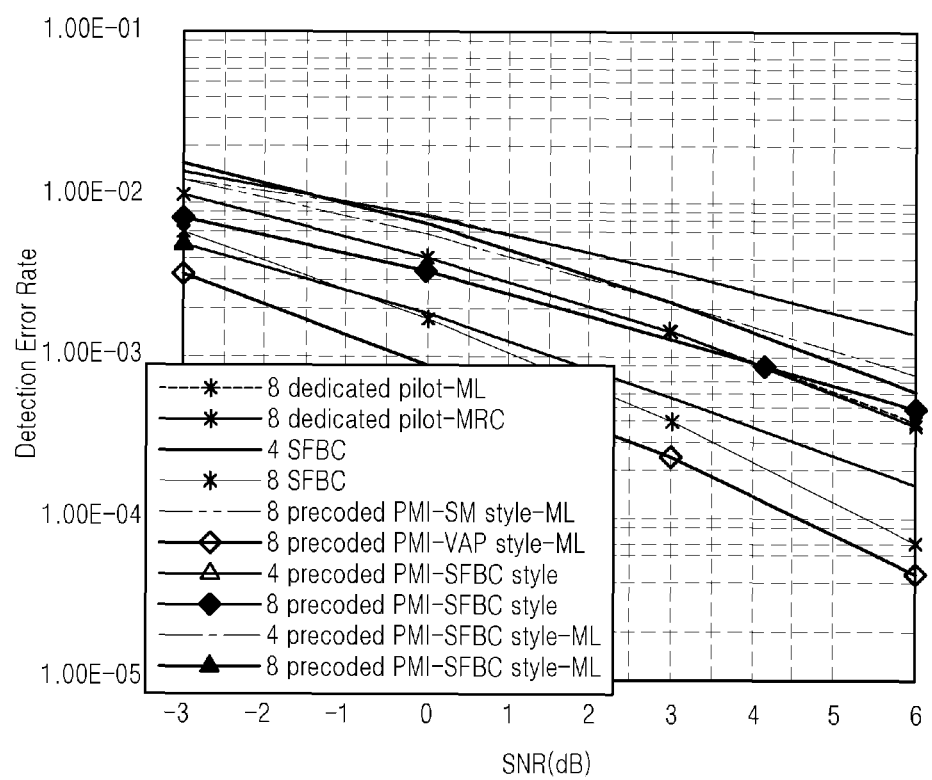
FIG. 7 is a graph showing a detection error rate when 2 transmit antennas are used and a rank is 2.

FIG. 4 is a graph showing a detection error rate when 4 transmit antennas are used and a rank is 1. FIG. 5 is a graph showing a detection error rate when 4 transmit antennas are used and a rank is 2. FIG. 6 is a graph showing a detection error rate when 2 transmit antennas are used and a rank is 1. FIG. 7 is a graph showing a detection error rate when 2 transmit antennas are used and a rank is 2.

The proposed scheme is indicated by 'precoded PMI'. A case of carrying only a weight on a pilot while excluding a weigh index is indicated by 'dedicated pilot'. A case of a conventional SFBC scheme is indicated by 'SFBC'. In the proposed scheme, 'SM style' uses a transmission method shown in Table 2, 'VAP style' uses a transmission method shown in Table 3, and 'SFBC style' uses a transmission method shown in Table 4. '8' or '4' indicates the number of weights included in a codebook.

Referring to FIGS. 4 to 7, the proposed scheme shows a low detection error rate. The detection error rate is a probability of not finding a correct weight when a receiver receives and uses weight information. The lower the detection error rate, the higher the possibility of finding the correct weight.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method of transmitting control information in a wireless communication system, the method comprising:
   multiplexing at least one transmit symbol with a pilot to generate a multiplexed pilot, wherein the at least one transmit symbol includes a weight index indicating a weight;
   precoding the multiplexed pilot with the weight to generate a precoded pilot, and
   transmitting the precoded pilot,
   wherein the weight is a precoding matrix included in a predetermined codebook.

2. The method of claim 1, wherein the at least one transmit symbol is transmitted via a same transmit antenna.

3. A method of detecting control information in a wireless communication system, the method comprising:
   receiving a precoded pilot;
   correlating the precoded pilot with each weight multiplied by a corresponding weight index, wherein each weight is included in a predetermined codebook; and
   detecting a weight included in the precoded pilot based on the correlating,
   wherein the precoded pilot is a pilot multiplexed with at least one transmit symbol and precoded by the weight, and
   wherein the at least one transmit symbol includes a weight index indicating the weight.

* * * * *